Patented Apr. 21, 1953

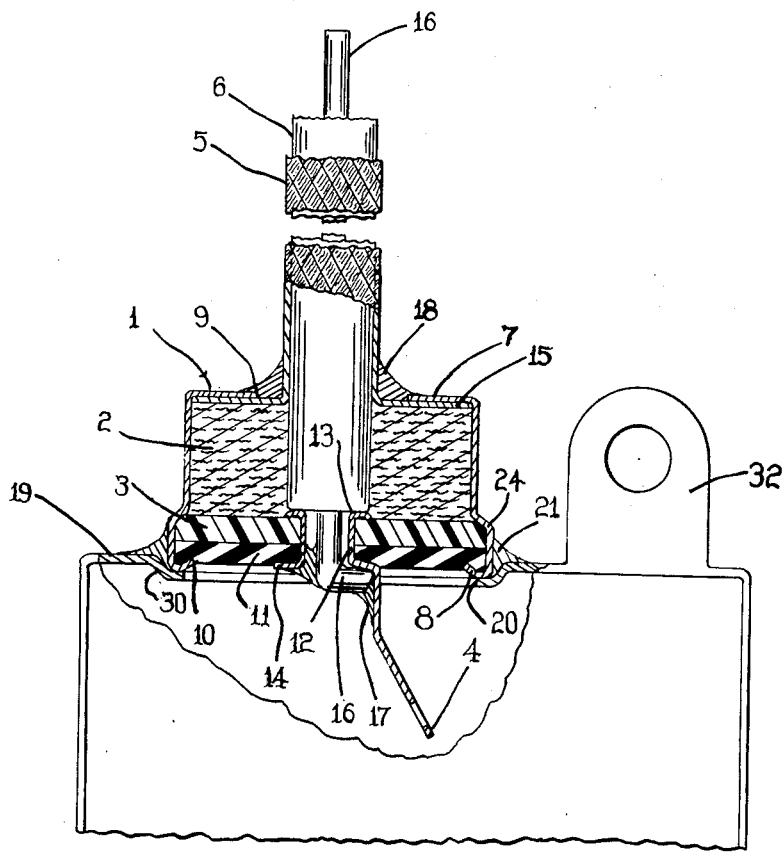

2,636,072

UNITED STATES PATENT OFFICE 2,636,072

HERMETIC SEAL BETWEEN SHIELDED CONDUCTOR AND CASING

Raymond A. Lamoureaux, Jr., North Adams, Mass., assignor to Sprague Electric Company, North Adams, Mass., a corporation of Massachusetts Application January 9, 1951, Serial No. 205,057

5 Claims. (Cl. 174—35)

The present invention relates to an electrical terminal assembly and more particularly to a high frequency, substantially hermetically sealed electrically shielded terminal lead assembly.

The need for sealing electrical capacitors, filters, etc. from moisture has long been recognized by the electrical industry. Various suggestions have been made and moisture resistant structures have been produced on an industrial scale. Although satisfactory structures have been manufactured, their cost has been high due to their complexity. Terminal leads have been a major problem in this field. Since openings must be provided in the housings for the emergence of these leads, and these leads are usually of pliable metal intended to permit severe lead manipulation, proper hermetic sealing must meet highly exacting requirements.

When capacitors or the like are used in shielded circuits, the sealing problem is further complicated by the necessity of providing a moisture-proof connection between the standard types of shielded conductors and a capacitor, for example, that is surrounded by an electrically conductive shield.

The object of this invention is to overcome the foregoing and related difficulties. Another object of this invention is to provide an electrically shielded terminal assembly that may readily be hermetically secured to a metallic housing for an electrical capacitor filter or the like.

The above, as well as further objects of the present invention, will be more fully understood from the following description, reference being made to the appended drawing wherein a preferred electrically shielded terminal lead assembly of the present invention is shown hermetically sealed to the housing of an electrical circuit element.

The assembly here shown has a tubular cap 1 and a centrally apertured gasket combination clamped between flanges 7 and 8 turned in from the ends of the cap. The gasket combination includes a resilient fibrous insulating gasket 2, a relatively rigid cover 3 of plastic composition, such as a phenol-formaldehyde resin, and a rubber washer 11, all of these members having aligned central apertures forming a passageway for a conductor. A metal eyelet 12 having outwardly turned flanges 13 and 14 is fitted in the central passageway adjacent the flange 8, and these eyelet flanges compressively clamp against the cover 3 and washer 11. Shown as integral with eyelet flange 14 is an extending terminal tab 4.

An insulated wire 16 is shown extending through the central passageway and has its inner end bent over and soldered to the eyelet at 17, the solder sealing the eyelet opening and the passageway. Sheathing the wire 16 is an insulating sleeve 6 shown as extending through resilient gasket 2 and abutting against the eyelet. In this form of the invention the shielding for wire 16 is shown as a braided metal tube 5 which is flared out as indicated at 15 and soldered at 18 under the flange 7. The solder and clamping engagement with gasket 2 acts as an additional seal as well as a rigidifying support to take up wire flexing stresses and prevent cracking of solder seal 17, and at the same time provides the necessary electrical shielding contact.

The lead assembly is conveniently fixed and sealed to a housing 19 by providing a wall of the housing with an opening 20, and if desired, shaping the wall around the opening in the form of a recessed seat 30 in which the end of cap 1 having flange 8 is received. By merely soldering the flange 8 to seat 30, as shown at 21, the shielded lead assembly is readily secured in place and the housing opening 20 is sealed. The housing 19 is shown in the figure as having a perforated ear 32 by means of which a cover (not shown) can be readily secured in sealed relation over an opening through which the housed condenser or filter can be inserted and the leads of condenser or filter manipulated into cooperation with tab 4 for example, and fastened in place, as by soldering. The housing can conveniently be in the general shape of a rectangular prism with one wall completely cut away. This is readily and inexpensively made as a sheet metal pressing, one or more tabs 32 being provided as integral extensions of any or all of the walls bounding the cut away wall. Where more than one insulated housing lead is required, a corresponding number of terminal assemblies can be mounted in place in the manner shown in the figure.

For greater versatility the lead assembly has only washers 3, 11, and eyelet 12 pre-fitted in the cap 1, as by providing the cap with a suitably shaped boss 24 against which these washers are clamped by turning in flange 8. The eyelet 12 may be crimped in place before the washers are inserted in the cap, to hold these washers together and simplify the assembly. One of the flanges 8, 7 is not fully turned in at this point. Any desired length of wire 16 can then be connected. When a wire carrying its own insulation 6 is used with the preassembled unit having flange 7 crimped and flange 8 uncrimped, the wire can first be threaded through the shielding 5, then the shielded end passed through the cap 1 after which its terminal portion is exposed by removing the outer covering, if any, and the shielding peeled back and flared out to expose the end of sheath 6. Washer 2 is then slid over the exposed sheath, and the cap forced back over the fanned out end of the shielding and the washer. The end of wire 6 can then be bent over and soldered to the eyelet 12, after which the eyeletted washer subassembly is sealed in the boss and flange 8 crimped in place and the shielding is soldered to flange 7. The resulting assembly can then be sealed around a housing opening as indicated above. With the preassembled unit having flange 8 crimped and flange 7 uncrimped the prepared wire end need only be provided with washer 2 and then pushed into the cap, its terminal portion soldered in place and flange 7 crimped over and soldered to the fanned out shielding.

After the housing is equipped with the desired number of terminal assemblies, the housing components can be inserted and soldered to the tab 4, and the housing sealed as by means of a cover.

It will be noted that shielded internal conductor of the final apparatus is completely shielded throughout its length, the gasket combination provides a sturdy and secure spacing of the shield as well as substantially hermetic sealing and the entire lead assembly can be readily connected and disconnected as desired by soldering operations. No special sealing precaution need be taken with the contents of housing 19, and simple condensers for example can be advantageously used in such a construction.

If desired the tab 4 may be omitted, connection being then made directly to the eyelet or to the end of wire 6, which can be arranged to project into the housing somewhat more than is shown in the figure. The shielding is not limited to being a braided sleeve, but can be of any other form such as a tube of sheet metal. The flared end 15 can also be soldered above rather than underneath the cap flange 7, particularly where the cap and its contents are all pre-assembled and the shielded wire secured later. This dispenses with all special cap crimping tools, etc. The wire 16 need not carry its own insulation sheath 6, but may have a detachable insulating member such as a continuous sleeve or a short spacer or series of separated spacers applied around it to hold the shielding suitably spaced from it.

As many additional apparently widely different embodiments of the invention may be made without departing from the spirit and scope hereof, it is to be understood that the invention is not limited to its specific embodiments except as defined in the appended claims.

What is claimed is:

1. An electrically shielded terminal lead assembly comprising a readily solderable tubular metal cap having at each end an inwardly extending flange, insulating gasket structure having a central passageway therethrough, said gasket structure including resilient portions clamped in sealed relation between the cap flanges, a metal eyelet extending through a portion of said gasket passageway and clamped in place in sealed relation with the gasket, an elongated metallic conductor extending through the gasket passageway and through the eyelet, said conductor being soldered to said eyelet to seal the gasket passageway, and an elongated shield conductor at least partially surrounding the first conductor and soldered to the cap flange through which the first conductor enters the gasket passageway.

2. The electrically shielded terminal assembly defined by claim 1 wherein the eyelet has an integral tab extending out beyond the gasket structure on the side opposite the one at which the elongated conductor enters.

3. The electrically shielded terminal assembly defined by claim 1 in combination with a metallic housing for an electrical circuit component, the housing having an opening therein for receiving the terminal assembly, and the cap being solder sealed to the housing around said opening.

4. The terminal assembly as defined by claim 1 in which the gasket structure includes a relatively rigid centrally apertured disc element clamped between overlying centrally apertured resilient elements, the eyelet being clamped around and in the apertures of the relatively rigid element and one of the resilient elements.

5. The terminal assembly as defined by claim 1 and including an insulating sheath enveloping the first conductor and spacing it from the shield conductor.

RAYMOND A. LAMOUREAUX, Jr.

References Cited in the file of this patent

UNITED STATES PATENTS

| Number | Name | Date |
|---|---|---|
| 720,592 | Kohn | Feb. 17, 1903 |
| 2,099,599 | de Lange | Nov. 16, 1937 |
| 2,459,193 | Sparks et al. | Jan. 18, 1949 |
| 2,490,596 | Morris | Dec. 6, 1949 |